Figure 1:
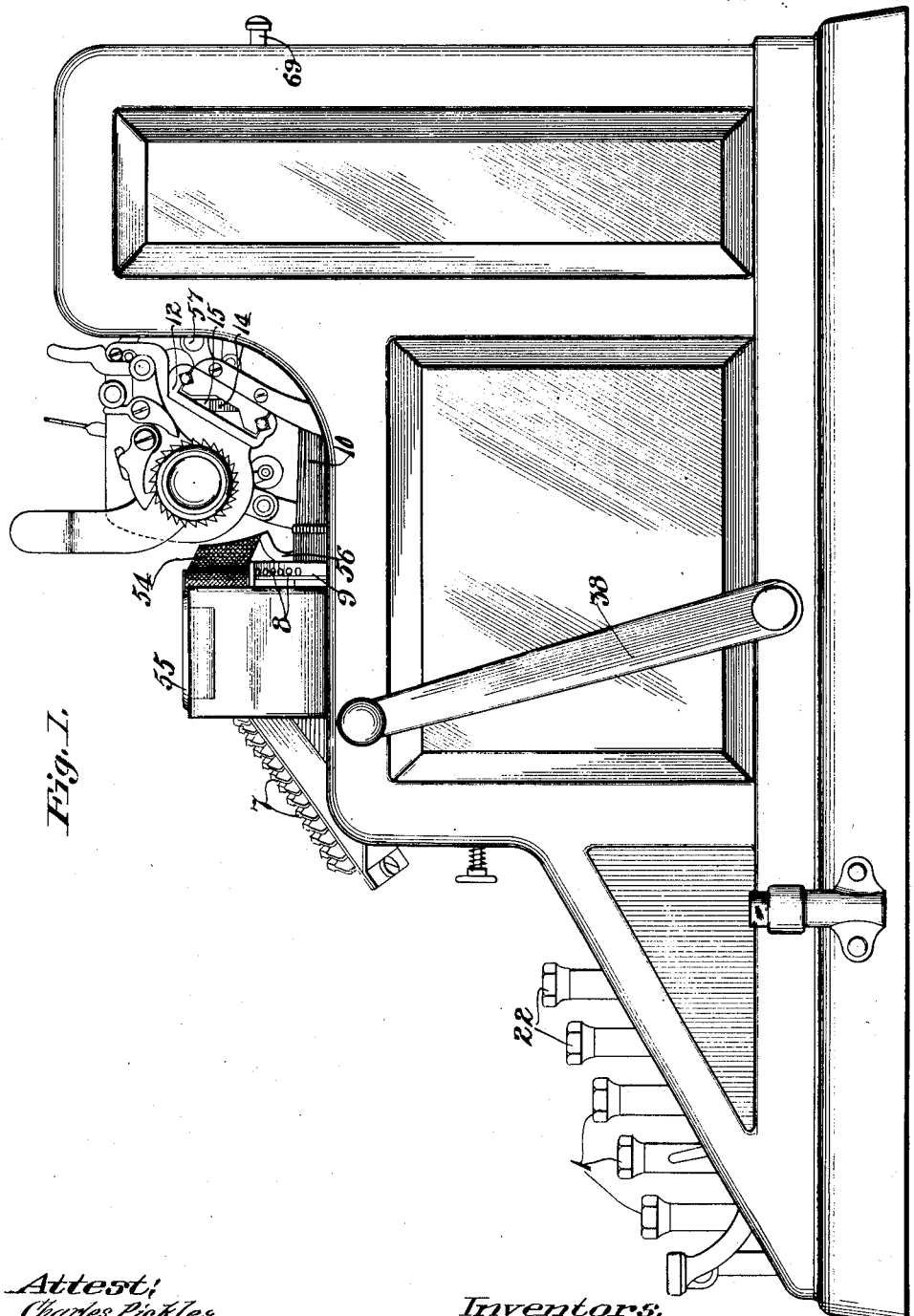

S. G. DORMAN & W. H. CLAYTON.
ADDING AND WRITING MACHINE.
APPLICATION FILED FEB. 11, 1907.

1,053,943.

Patented Feb. 18, 1913.

7 SHEETS—SHEET 3.

S. G. DORMAN & W. H. CLAYTON.
ADDING AND WRITING MACHINE.
APPLICATION FILED FEB. 11, 1907.

1,053,943.

Patented Feb. 18, 1913.

7 SHEETS—SHEET 6.

Attest:
Wm H Scott
L. C. Kingsland

Inventors,
Samuel G. Dorman,
William H. Clayton,
by J. D. Rippey
atty.

S. G. DORMAN & W. H. CLAYTON.
ADDING AND WRITING MACHINE.
APPLICATION FILED FEB. 11, 1907.

1,053,943.

Patented Feb. 18, 1913.

7 SHEETS—SHEET 7.

UNITED STATES PATENT OFFICE.

SAMUEL G. DORMAN AND WILLIAM H. CLAYTON, OF POPLAR BLUFF, MISSOURI, ASSIGNORS TO DALTON ADDING MACHINE COMPANY, OF ST. LOUIS, MISSOURI, A CORPORATION OF MISSOURI.

ADDING AND WRITING MACHINE.

1,053,943.  Specification of Letters Patent.  Patented Feb. 18, 1913.

Application filed February 11, 1907. Serial No. 356,916.

*To all whom it may concern:*

Be it known that we, SAMUEL G. DORMAN and WILLIAM H. CLAYTON, citizens of the United States, residing at Poplar Bluff, Butler county, Missouri, have invented a new and useful Adding and Writing Machine, of which the following is a specification.

This invention relates to adding and recording machines of the type wherein two recording mechanisms are employed to record upon one platen, one of said recording mechanisms serving for the adding mechanism and one acting for usual typewriting purposes.

An object of the invention is to produce a machine of the character referred to consisting of two independently operable recording mechanisms, one of which coöperates with the adding mechanism, and one of which is operable to produce typewritten records, and both operating to record upon paper on a single platen, and provided with means under the control of the operator whereby the records produced by one of said mechanisms may be in one color, and the records produced by the other mechanism may be in a distinctive color.

Another object of the invention is to produce a combined adding and typewriting machine in which any portions of the records may be produced in one color, and any other desired portions of the records may be produced in a distinctive color; such, for instance, as the typewriting records to be of a single color throughout, and the adding mechanism records of a single color throughout which is distinctive from the typewriting records, or portions of either or both records may be recorded in distinctive colors.

The particular features of the typewriting mechanism detached from the adding mechanism are shown and described in the application of William H. Clayton for a typewriting machine, filed September 10, 1906, Serial Number 334,029; and the particular features of the adding mechanism detached from the typewriting mechanism are shown and described in the application of Samuel G. Dorman, for an adding and recording machine, filed October 16, 1906, Serial Number 339,230.

The invention also relates to specific improvements upon that type of adding and writing machines which is the subject-matter of the patent to Hubert Hopkins dated September 24, 1912 and numbered 1,039,130, and the specific object of the invention is to combine the typewriting and adding mechanisms thereof with a single polychrome ribbon to be acted upon by the type of both mechanisms and connections operated incidentally to the operation of the typewriting mechanism and the recording mechanism of the adding department of the machine to utilize one color of the ribbon, and means for controlling the ribbon to utilize another color of the ribbon in producing the records so that selected portions of the records may be produced in distinctive colors upon the same sheet of paper without removing the paper from the platen.

With these objects in view we have illustrated one embodiment of our invention in the accompanying drawings in which—

Figure 2:
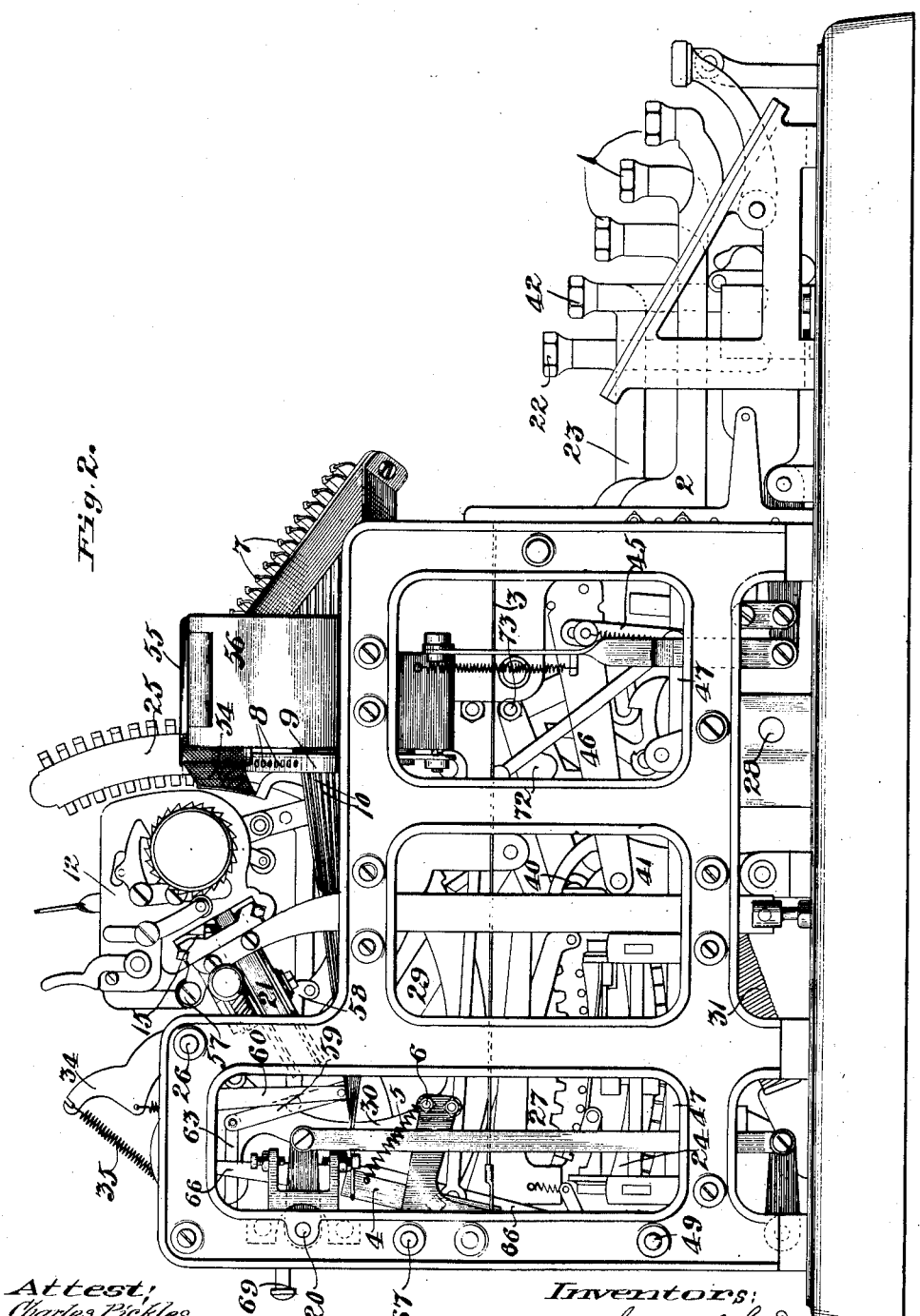
Figure 3:
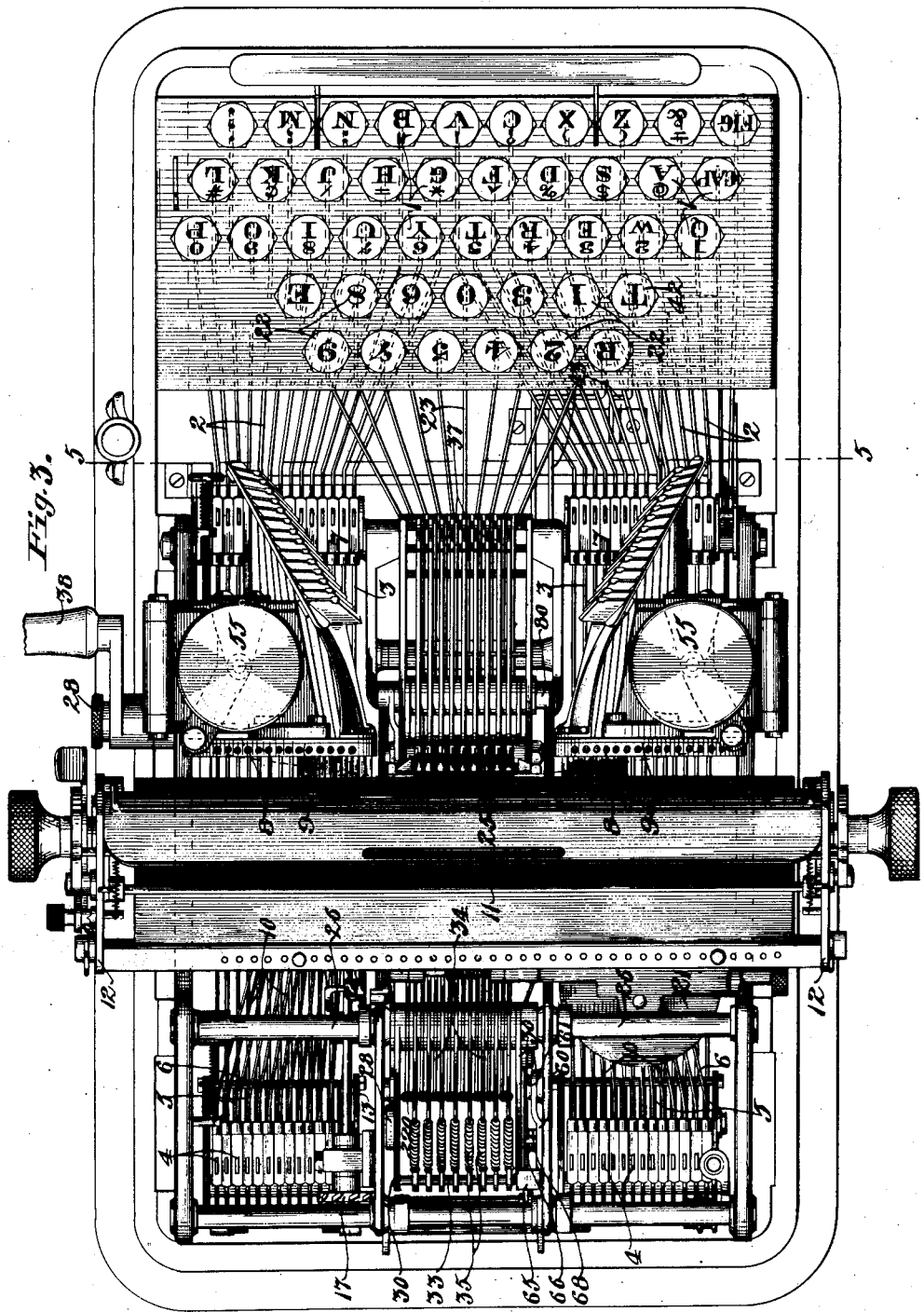
Figure 4:
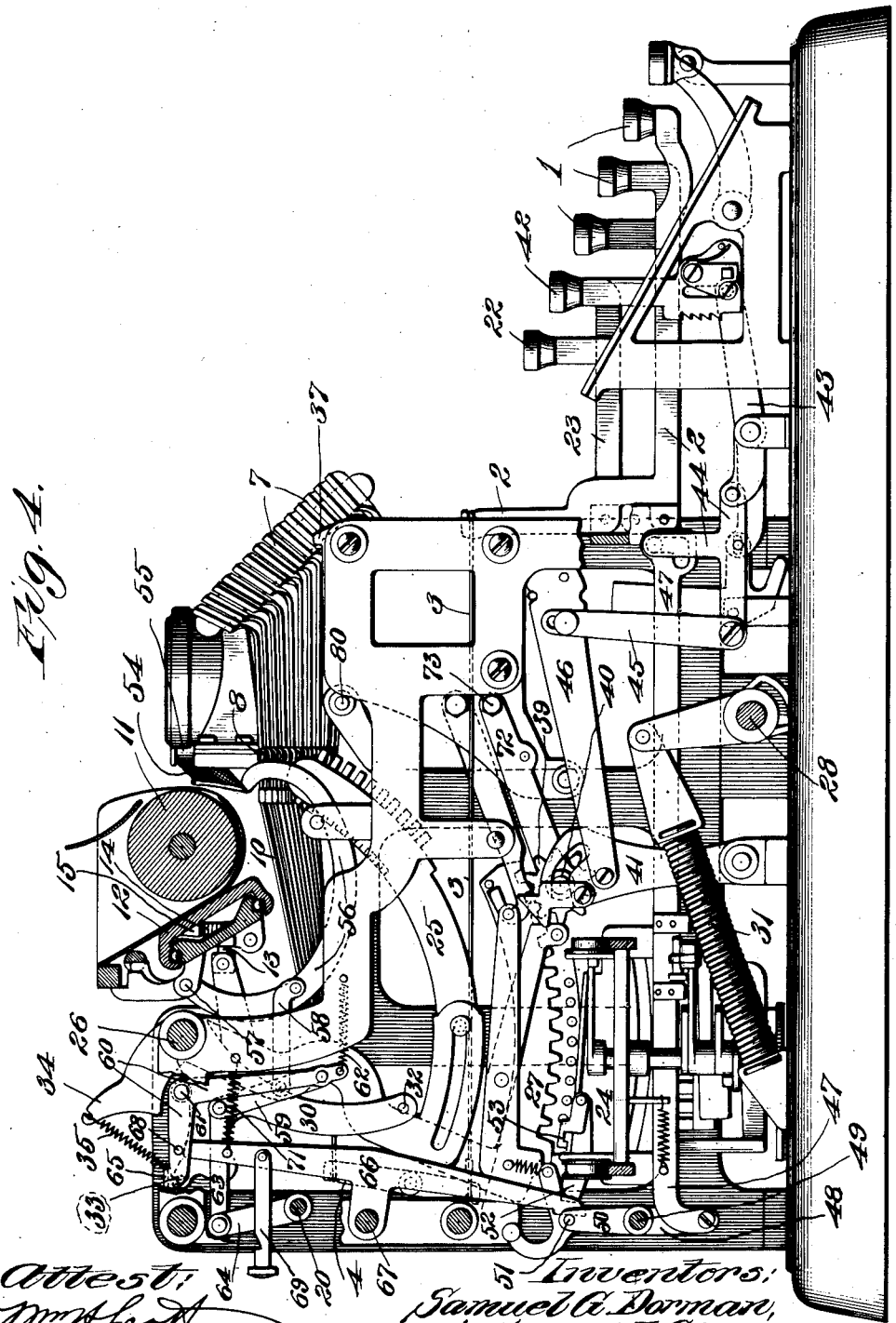
Figure 5:
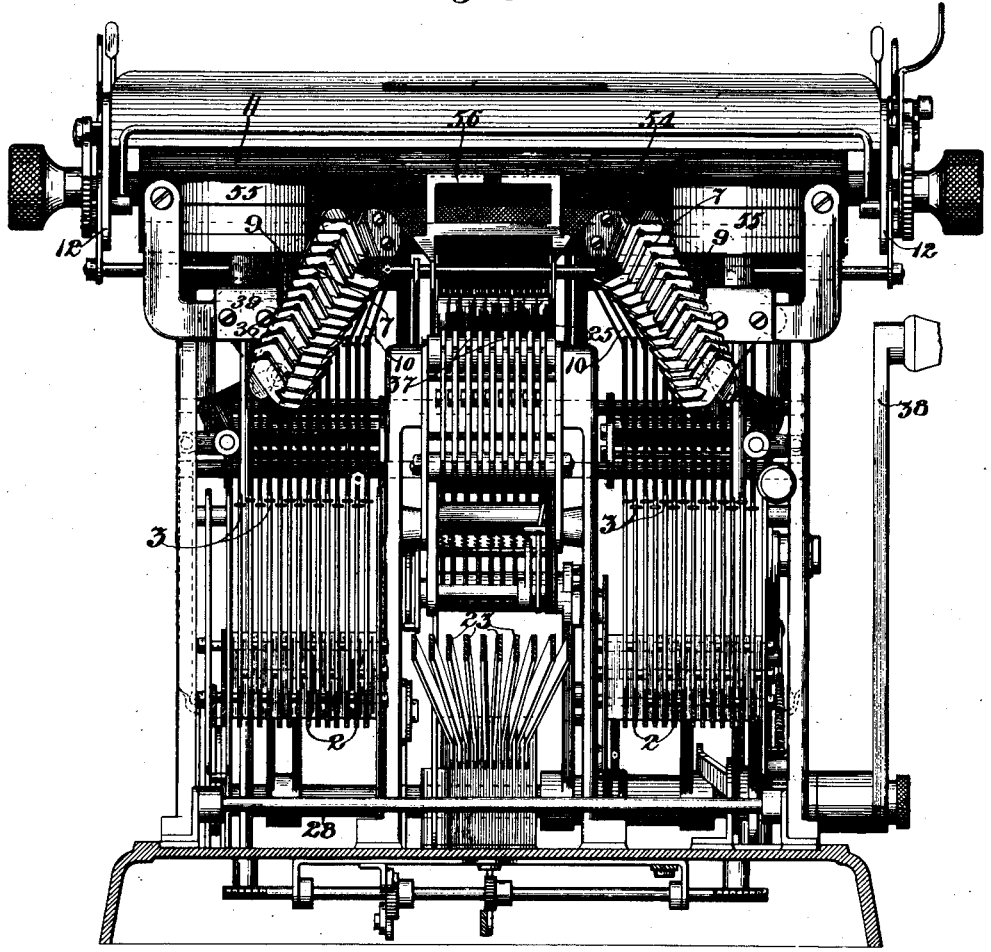
Figure 6:
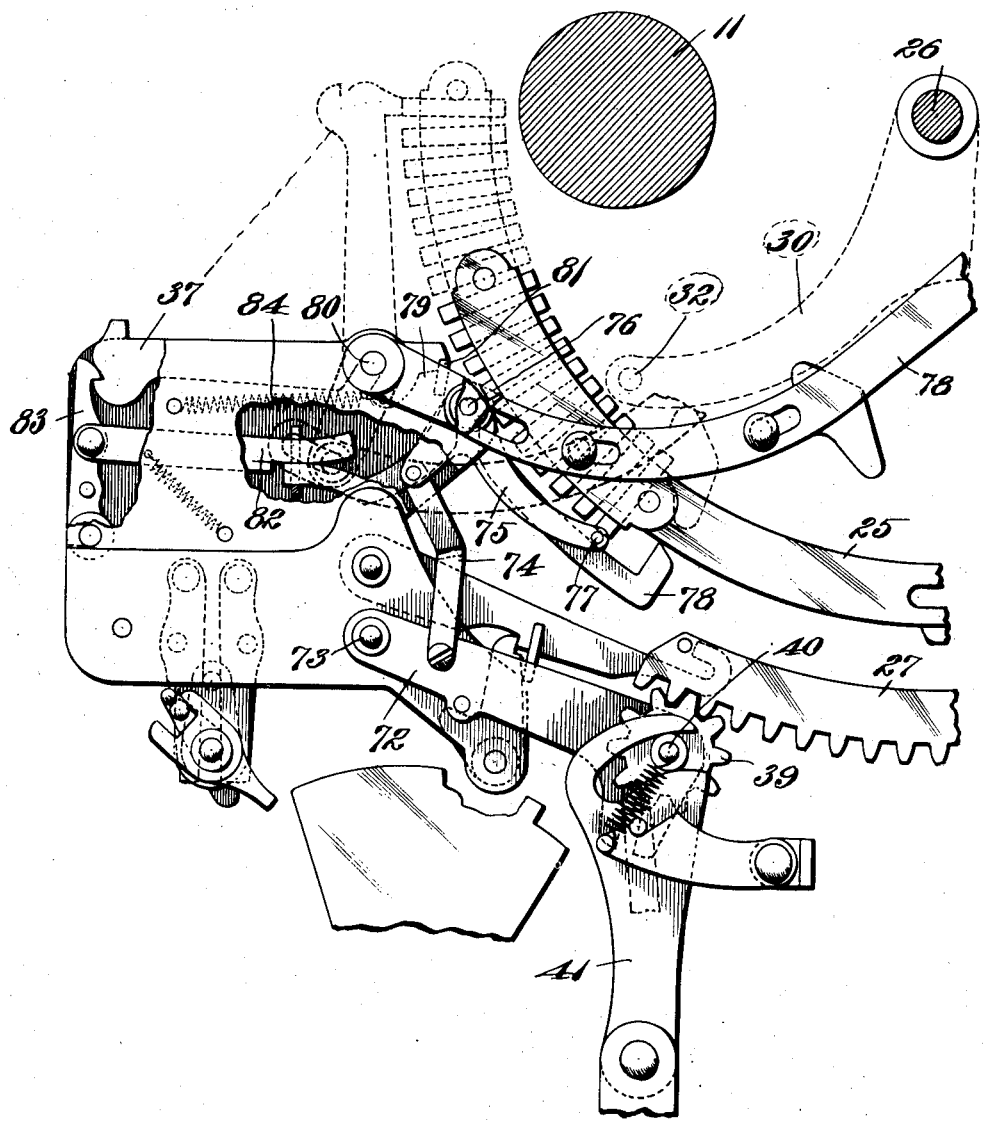
Figure 7:
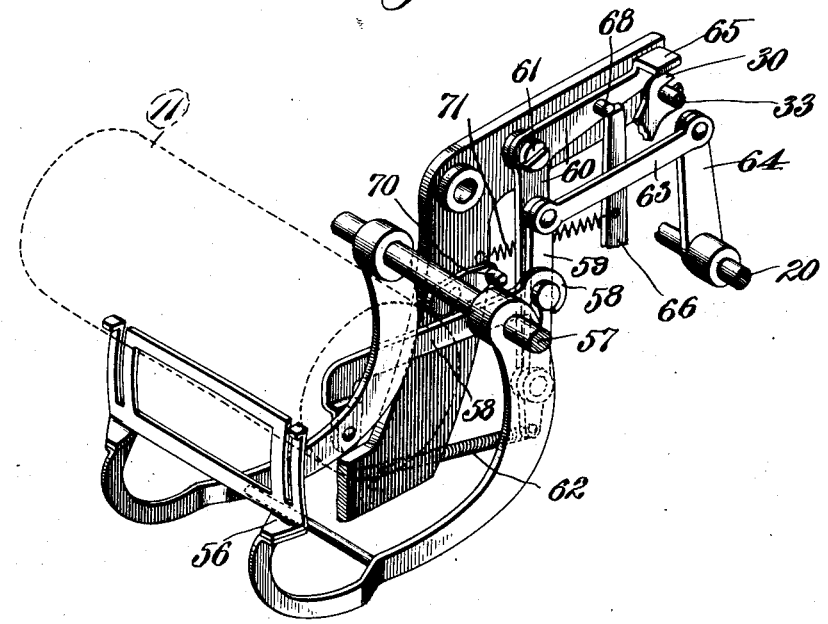
Figure 8:
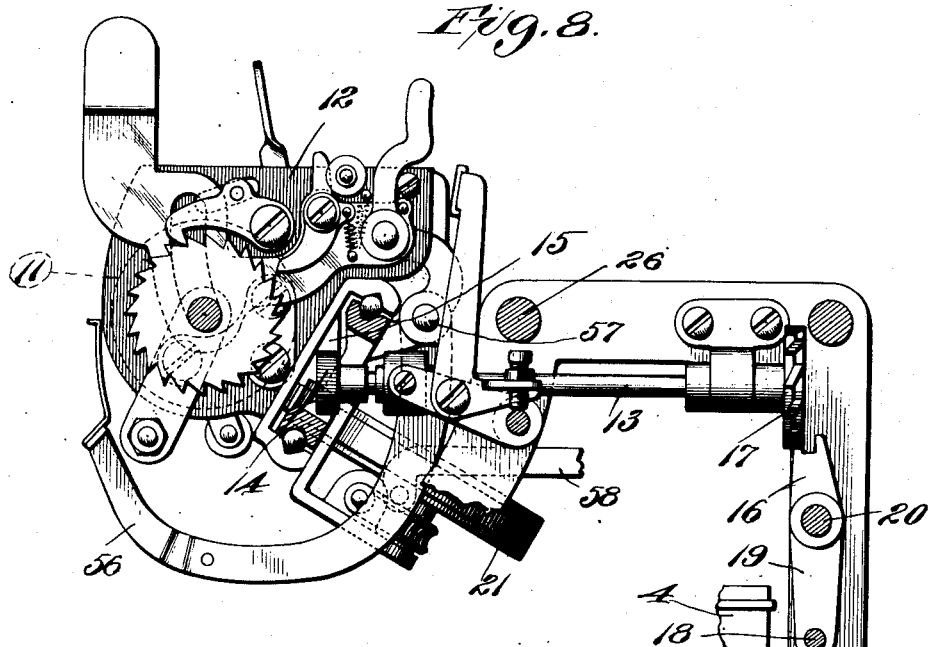

Figure 1 is a side elevation of a machine containing our present invention. Fig. 2 is a side elevation partially in section illustrating the train of connections from the typewriter keys to the typewriter type-bars. Fig. 3 is a plan view of the machine with the case removed. Fig. 4 is a longitudinal sectional view of the machine illustrating the ribbon controlling device. Fig. 5 is a sectional view along a line such as 5—5 of Fig. 3. Fig. 6 is a detail view of a part of the recording mechanism included within the adding department of the machine. Fig. 7 is a perspective view of the ribbon shifting devices by means of which the ribbon is moved to present the different desired colors thereof to be acted upon by the type of the two recording mechanisms. Fig. 8 is a sectional view illustrating the paper carriage and the support therefor, and also illustrating the ribbon moving device and the mechanism for controlling lateral movement of the carriage.

The subject-matter of this invention comprises the novel arrangement and coöperation of the two recording mechanisms whereby they may be operated to record in different colors. The typewriter keys 1 are arranged in transverse rows upon a keyboard. The keys are mounted upon bellcrank levers 2 which are arranged in two groups. The upper or inner ends of the typewriter key levers are connected by links 3 with levers 4 which, in the arrangement shown, are pivotally supported near the rear of the machine. The links 3 connect the upper ends of the key levers with the lower ends of the levers 4 so that when the typewriter keys are depressed the upper ends of the levers 4 will be actuated rearwardly. Springs 5 connect the levers 4 with rods 6 thereby actuating the upper ends of said levers 4 forwardly and holding the keys in their normal elevated positions. The typewriting type bars 7 are pivoted upon spindles 8 which are mounted in pivoted frames 9. Actuation of the type bars 7 is effected by means of links 10 which connect the type bars with the upper ends of the levers 4, respectively. Therefore, each train of recording devices in the typewriting mechanism includes a key 1 mounted upon the front end of the bell crank lever 2, the upper end of which is connected to the lower end of a corresponding lever 4 and a link 10 connecting each of the levers 4 with a corresponding pivoted type bar 7 and a spring 5 acting to restore the keys and the type bars and the remaining members of each train of connections to idle position after operation.

The platen 11 is mounted in a laterally movable carriage 12 and is operable to hold and present paper to be acted upon by the type bars. Lateral movement of the paper carriage and platen is effected by a suitable escapement mechanism. One form of such escapement mechanism is illustrated generally in Fig. 8 and includes a rod or shaft 13 suitably supported in bearings and having a pinion 14 meshing with a rack 15 on the paper carriage. Step by step movement is effected through the oscillation of an escapement member 16 engaging with an escapement pinion 17 on the end of the rod or shaft 13. The oscillation of the escapement member 16 is effected on depression of the typewriter keys 1 by the levers 4 engaging against a roll 18. The rod 18 is supported by depending arms 19 rigid with the rock shaft 20 upon which the escapement member 16 is secured. A motor 21 of any suitable construction and arrangement is supported by the frame of the machine and actuates or moves the paper carriage laterally when such movement is permitted by the operation of escapement devices in the well understood manner. The specific construction and arrangement of these devices are described in detail in the Clayton application #334,029 and do not constitute any part of the present invention, and, therefore, do not require specific detailed illustration and description particularly since any of the known escapements and motor devices for paper carriages may readily be adapted for use in this machine.

The adding mechanism includes a series of ten numeral keys 22 arranged in rows in the same key-board with the typewriter keys, and, in the one embodiment shown, the adding mechanism keys are rearward from the typewriter keys. The keys 22 are mounted upon levers 23 which are operable effectively to set up numbers in a laterally movable carriage 24. The numeral keys and key levers are operable to set up numbers in the carriage 24 in the well understood manner as described in the Hopkins Patent, #1,039,130. The type-carriers 25 are pivotally supported upon a shaft 26, and the racks 27 are also pivoted upon said shaft 26 and control the movement of the type-carriers. A rock shaft 28 has a link 29 connected thereto and also connected to the arms 30 which also swing from the shaft 26. Strong springs 31 hold the shaft 28 in its idle position and return said shaft to idle position after each movement thereof. The arms 30 support a rod 32 in front of the vertical arms of the racks and type-carriers, so that when the shaft 28 is returned to idle position by the springs 31 the racks and type-carriers are also returned to idle position by the rod 32. The arms 30 carry a rod 33 (Fig. 3), and said rod 33 is connected with extensions 34 of the type-carriers by springs 35, so that when the arms 30 are operated by forward rocking of the shaft 28, the rod 33 is moved downwardly, thereby extending the springs 35 and moving the type-carriers 25 in front of the platen, for ward movement thereof being limited by the carriage 24, in the well understood manned described in the Hopkins patent. At the proper time, after the type-carriers are stopped in position to aline the desired type adjacent to the platen, type driving hammers 37 are automatically driven against the type, thereby driving the type against the ribbon to make impressions upon the paper carried by the platen. The shaft 28 is rocked by means of a handle or lever 38 (Figs. 1 and 3), and on completion of the printing by action of the hammers against the type as above explained, the handle is released and the type-carriers and racks are returned to idle position by the springs 31. The automatic adding mechanism of the machine of the Hopkins patent which is also embodied in this machine, includes a series of adding wheels 39 supported upon a shaft 40 mounted in a swinging frame 41, and automatically lowered out of mesh with the racks 27 just before said racks start forwardly in a recording operation, and are automatically raised into mesh with said racks just before said racks are started on their return movement, thereby adding the numbers recorded, in the well understood manner and operation of the Hopkins patent aforesaid.

The mechanism for recording a total represented in the adding mechanism includes a key 42 arranged adjacent to the keys 22 and connected to the front end of a lever 43. When the key 42 is depressed it raises the rear end of the lever 43 which is pivoted to another lever 44 supported upon a stud. The lever 44 has a link 45 connecting the rear end of said lever 44 with the operating arm 46 whereby the swinging frame 41 is operated to raise and lower the adding wheels into and out of mesh with the racks 27. In the well understood manner the operation of the link 45 by the key 42 and the connections therefrom to the operating arm 46 causes the adding wheels 39 to remain in mesh with the racks 27 during forward movement of the said racks, so that any total or number represented in the adding wheels will be printed. The lever 44 has an upwardly extending arm which is connected to a link 47 extending toward the rear of the machine and connected to an arm 48 on a rock shaft 49. The rock shaft 49 is provided with two arms 50 which carry a rod 51. Depression of the key 42, through the train of connections described, swings the rod 51 forwardly, actuating the sliding element 52 and lowering the abutment 53 in the well understood manner to permit the racks and type carriers to move forwardly to record the total represented in the adding wheels. The specific construction and arrangement of the adding mechanism above described are well known, and it is in connection with these well known features of the adding mechanism and of the typewriting mechanism that our present invention is employed and arranged to coöperate.

Our invention includes mechanism for moving the ribbon to present different colors at the writing line adjacent to the platen so that the joint records may be made in distinguishing colors for purposes of differentiation or other purposes.

We will now describe the mechanism for moving the ribbon to present the different colors thereof so that records in different colors may be effected at the will of the operator as above explained.

The ribbon 54 includes two strands of different color and is operated in the well known manner by spool mechanism 55. Between the spools which are at opposite sides of the machine, as usual, the ribbon passes through pivoted ribbon guides 56 which are in the form of levers pivoted upon a shaft 57, and which, by gravity, hold the ribbon in its normal position. A link 58 (Figs. 4 and 7) connects one of the ribbon guides 56 with a lever 59. The lever 59 is pivotally supported upon the depending arm of a bell crank lever 60 which is pivoted upon a support 61, and the lower end of which is actuated forwardly toward the platen by a spring 62. A link 63 connects the upper end of the lever 59 with an arm 64 attached to the rock shaft 20 which is rocked at each depression of a typewriter key, as previously explained in describing the typewriting mechanism and the operation of the escapement therefor. Therefore, when any typewriter key is depressed to operate one of the type bars 7 the connections from the shaft 20 raise the ribbon guides 56 a sufficient distance to present the upper strand of the ribbon over the writing line to receive the impact of the type. As the train of recording mechanism returns to idle position after the typewriting key is released, the ribbon guides 56 move downwardly and the connections from the shaft 20 to the ribbon guides return to idle position. When the parts operate in this manner all of the records of the typewriting mechanism will appear in one color.

The lever 60 is a bell crank lever (Figs. 4 and 6) and has one arm extending rearwardly and provided with a lateral extension 65 which projects over the adjacent arm 30 which carries the rod 33. When the arms 30 are in their idle position and the recording mechanism of the adding department of the machine is idle, the lever 60 is held stationary and is not operated when the typewriting mechanism operates. A lever 66 is pivoted at 67 (Fig. 4) and has its lower end in front of the rod 51 and its upper end normally under a projection 68 (Fig. 7) on the lever 60. When an item is recorded by the type-carriers 25 as above explained, the arm 30 moves away from the projection 65 on the lever 60 and permits the spring 62 to retract and actuate forwardly the link 58 and thereby move the ribbon guides 56 to position the ribbon adjacent to the writing line. Normally, movement of the ribbon guides is stopped at the time the upper strand of color in the ribbon is positioned at the writing line, by engagement of the projection 68 with the upper end of the lever 66. A link 69 is pivoted to the lever 66 and projects through the case of the machine. The link 69 may be employed to move and hold the upper end of the lever 66 out of the path of movement of the projection 68, so that movement of the lever 60 will not be stopped by said lever 66. When the link 69 is so operated and adjusted to move and hold the lever 66 out of the path of movement of the projection 68, the spring 62 moves the ribbon guides 56 to position the lower strand of color of the ribbon at the writing line, which lower strand of color of the ribbon is distinguished from the upper strand of color of the ribbon. When thus operated to utilize the lower strand of color, movement of the lever 60 is stopped by an abutment 70 (Fig. 7) in position to hold the lower strand of color of the ribbon at the writing line. When the lever 66 acts as a stop for the lever 60 the records produced by the type-carriers 25 will be in the single color of the upper strand of the ribbon, but any selected items recorded by the type-carrier 25 may be recorded in the distinguishing color by holding the lever 66 out of the path of movement of the projection 68, thereby enabling the ribbon guides 56 to present the lower strand of color of the ribbon to receive the impact of the type in recording operation.

Provision is made in our present invention whereby the totals contained or represented in the adding wheels 39 will be printed in a color which is distinctive from the color of the upper strand of the ribbon. In one operation of the machine the typewriting mechanism records in the color of the upper strand, therefore, the totals will be recorded in a color which is distinctive from the color in which the typewritten records are recorded, and which may also be distinctive from the color in which the items are recorded by the type-carriers 25. When the key 42 is depressed it moves the rod 51 forwardly, as previously explained. As heretofore described, and as illustrated in Fig. 4, the lower end of the lever 66 is in front of the rod 51 so that when the rod 51 is moved forwardly it actuates the lever 66 and moves the upper end of the lever out of the path of movement of the projection 68. Therefore, when the type-carriers move forwardly to record the number in the adding mechanism, by the well known operation, the lever 60 is actuated by its spring 62 until stopped by the abutment 70. As previously explained this operation places the lower strand of the color of the ribbon adjacent to the recording line to receive the impact of the type, thereby recording the total in a color which is distinctive from the color in which the type written records are recorded when the upper strand of the ribbon is utilized for the typewritten records; and which is also distinctive from the color in which the items are recorded when the items are recorded by use of the upper strand of color of the ribbon. A spring 71 (Figs. 4 and 7) connects the upper part of the lever 66 with a stationary member and yieldingly holds said lever 66 in position to constitute an abutment for the projection 68 on the lever 60. Said spring yields to the pressure by the rod 51 when the key 42 is depressed, and also yields to force applied to the element 69.

When the adding mechanism is "cleared," that is when no number is contained or represented in the adding wheels 39, it is desirable to indicate upon the paper a "clear" condition of the adding mechanism when the handle or lever 38 is operated. It is desirable to indicate this "clear" condition of the adding mechanism before listing the items to be added. Our invention includes means for automatically indicating a "clear" condition of the adding mechanism when the handle 38 is operated with the key 42 in a depressed position. As previously explained, depression of the key 42 causes the adding wheels 39 to remain in mesh with the racks 27 during forward movement of the racks, or during forward movement of the handle 38. The shaft 40 of the wheels 39 is connected to two arms 72 which are pivotally held upon a support 73. When the swinging frame 41 is oscillated to raise and lower the adding wheels 39 the arms 72 are also oscillated. One of the arms 72 is connected by a link 74 with the front end of a lever 75 pivoted upon a rod or shaft 76. The rear or inner end of the lever 75 has a pin 77 projecting laterally over the inner or rear end of the lever 78, so that when the adding wheels 39 are in their elevated position, that is in mesh with the racks 27, the link 74 and the lever 75 holds the rear end of the lever 78 in a depressed position, and the front end of said lever in an elevated position. A link 78 which connects one of the arms 30 with an arm 79 on the rock shaft 80 is actuated forwardly when the said arms 30 are moved forwardly by operation of the lever or handle 38. The bail 81 is supported by the rock shaft 80 and is swung downwardly and forwardly thereby when said shaft 80 is rocked by the link 78, in the well understood manner of the Hopkins patent, No. 1,039,130 and the Dorman application No. 339,230. The upward position of the arm 72 which upholds the front end of the lever 78, as previously explained, also upholds the rear end of a bar 82, so that the downward and forward movement of said bail 81 will engage against the rear end of the bar 82 forwardly. The front end of the bar 82 is pivoted to a latch 83 normally in engagement with the type driving hammer 37 in units order. From the foregoing it is obvious that if the key 42 be held in depressed position and the handle or lever 38 operated forwardly the bail 81 will release the latch 83 from the hammer in units order, permitting said hammer to be actuated or driven against the type by its spring 84. Since depression of the key 42 also causes the lower strand of color of the ribbon to be positioned at the printing line when the handle is operated, and since, in the clear condition of the adding mechanism, the hammer in units order is released to drive one of the type to print as an indication of a "clear" condition of the adding mechanism, it is obvious that the character thus printed will be printed in the color of the lower strand of the ribbon, which may be different from the color in which the items to be added are listed.

From the foregoing description it will be understood that the single polychrome ribbon is acted upon by the type of both mechanisms, and that the connections for moving the ribbon are operated incidentally to the operation of the typewriting mechanism and also incidentally to the operation of the type-carriers 25 to utilize one color strand of the ribbon, and that the machine contains manipulative means whereby selected portions of the records may be written in distinctive colors.

It is obvious to those skilled in the art to which this invention pertains that there may be variations in many respects from the arrangement, combination and construction of parts shown and described without departing materially from the spirit and scope of the invention. We do not restrict ourselves to exact features except where the claims specifically recite such exact features, but

What we claim and desire to secure by Letters Patent of the United States is:—

1. The combination with typewriting mechanism, separate mechanism operable to record numbers, a single platen arranged to feed paper to both mechanisms, a single polychrome ribbon to be acted on by the type of both mechanisms, ribbon guides holding said ribbon, and connections operated incidentally to the operation of said typewriting mechanism and said separate recording mechanism to move said ribbon guides to utilize only one color of said ribbon, of means whereby one of said mechanisms may be caused to move said ribbon guides to utilize another color of said ribbon, substantially as specified.

2. The combination with typewriting mechanism, a platen arranged to hold paper, separately operable recording mechanism upon which said typewriting mechanism is superimposed, and means for operating said recording mechanism to record on paper on said platen, of means for causing said recording mechanism to record in a color distinctive from the records of the typewriting mechanism, substantially as specified.

3. An adding and writing machine comprising a platen arranged to hold paper, typewriting mechanism operable to print on paper held by said platen, type-carriers separate from said typewriting mechanism, means for moving said type-carriers toward said platen, a polychrome ribbon to be acted upon by said typewriting mechanism and said type-carriers, a ribbon guide holding said ribbon, means operated incidentally to the operation of said typewriting mechanism and said type-carriers for moving said ribbon guide to place the ribbon in position to receive the type blows, and means for causing said type-carriers to utilize a color of said ribbon which is distinctive from the color utilized by the typewriting mechanism, substantially as specified.

4. A machine for making out statements and similar records, comprising a paper carriage, mechanism for recording upon paper in said carriage the words included in the statements and records in one color, a set of keys arranged in a key-board controlling said mechanism, mechanism operable to record upon the same paper in said paper carriage the items included in the statements and records, in the same color in which the words are recorded, a set of keys arranged rearward from the first-named keys in the same key-board therewith, and whose operation is necessary before the items may be recorded, and mechanism whereby said items recording mechanism may be caused to record the total of the items in a color which is distinctive from the color in which the words and items are recorded.

In testimony whereof, we hereunto affix our signatures to this specification this 26th day of January, 1907, in the presence of two witnesses.

SAMUEL G. DORMAN. [L. S.]
WILLIAM H. CLAYTON. [L. S.]

Witnesses:
 NETTIE WINSTON,
 H. D. MARLIN.